(12) United States Patent
Addison

(10) Patent No.: US 12,484,861 B2
(45) Date of Patent: Dec. 2, 2025

(54) DETERMINING ARTERIAL PRESSURES

(71) Applicant: Covidien LP, Mansfield, MA (US)

(72) Inventor: Paul S. Addison, Edinburgh (GB)

(73) Assignee: Covidien LP, Mansfield, MA (US)

( * ) Notice: Subject to any disclaimer, the term of this patent is extended or adjusted under 35 U.S.C. 154(b) by 816 days.

(21) Appl. No.: 16/184,638

(22) Filed: Nov. 8, 2018

(65) Prior Publication Data

US 2020/0146636 A1    May 14, 2020

(51) Int. Cl.
| | |
|---|---|
| *A61B 5/00* | (2006.01) |
| *A61B 5/0205* | (2006.01) |
| *A61B 5/021* | (2006.01) |
| *A61B 5/026* | (2006.01) |
| *A61B 5/1455* | (2006.01) |

(52) U.S. Cl.
CPC ............ *A61B 5/7278* (2013.01); *A61B 5/021* (2013.01); *A61B 5/026* (2013.01); *A61B 5/14553* (2013.01); *A61B 5/742* (2013.01)

(58) Field of Classification Search
CPC ....... A61B 5/7278; A61B 5/021; A61B 5/742; A61B 5/14553; A61B 5/026; A61B 5/0205
See application file for complete search history.

(56) References Cited

U.S. PATENT DOCUMENTS

| | | | |
|---|---|---|---|
| 5,743,267 A | 4/1998 | Nikolic et al. | |
| 6,599,251 B2 | 7/2003 | Chen et al. | |
| 6,689,069 B2 | 2/2004 | Bratteli et al. | |
| 7,070,566 B2 | 7/2006 | Medero et al. | |
| 7,927,283 B2 | 4/2011 | Riobo Aboy | |
| 8,366,627 B2 | 2/2013 | Kashif et al. | |
| 8,702,604 B2 | 4/2014 | Karamanoglu et al. | |
| 9,474,451 B2 | 10/2016 | Brady et al. | |
| 9,861,317 B2 | 1/2018 | Ochs | |
| 2009/0326386 A1 | 12/2009 | Sethi et al. | |
| 2011/0105912 A1 | 5/2011 | Widman et al. | |
| 2012/0029365 A1* | 2/2012 | Greenhut | A61B 5/7239 600/485 |
| 2013/0030270 A1* | 1/2013 | Chiou | A61B 5/369 600/344 |
| 2013/0079656 A1* | 3/2013 | Dripps | A61B 5/726 600/529 |

(Continued)

FOREIGN PATENT DOCUMENTS

WO    2017001023 A1    1/2017

OTHER PUBLICATIONS

Elgendi et al. ("Toward Generating More Diagnostic Features from Photoplethysmogram Waveforms," Diseases, Published: Mar. 11, 2018, vol. 6, issue 20) (hereinafter—Elgendi) (Year: 2018).*

(Continued)

*Primary Examiner* — Justin Xu
(74) *Attorney, Agent, or Firm* — Draft Masters IP, LLC

(57) ABSTRACT

An example autoregulation monitoring system includes processing circuitry configured to receive a blood pressure signal indicative of a blood pressure of a patient; determine a derivative of at least a portion of the blood pressure signal; determine, based on the derivative, a characteristic arterial pressure (CAP) value; determine, based on the CAP value, an autoregulation value of the patient; and output a signal indicative of the autoregulation value of the patient.

18 Claims, 7 Drawing Sheets

(56) References Cited

U.S. PATENT DOCUMENTS

| | | | |
|---|---|---|---|
| 2014/0114152 A1* | 4/2014 | Fournier | A61B 5/6843 600/324 |
| 2014/0143064 A1* | 5/2014 | Tran | A61B 5/01 705/14.66 |
| 2015/0112605 A1* | 4/2015 | Watson | A61B 5/08 702/19 |
| 2015/0208987 A1* | 7/2015 | Shan | A61B 5/7278 600/407 |
| 2015/0257658 A1* | 9/2015 | Geesbreght | G16H 50/20 600/301 |
| 2016/0345913 A1* | 12/2016 | Montgomery | G16Z 99/00 |
| 2016/0367197 A1 | 12/2016 | Addison et al. | |
| 2017/0095161 A1 | 4/2017 | Addison et al. | |
| 2017/0105631 A1 | 4/2017 | Addison et al. | |
| 2017/0105671 A1 | 4/2017 | Borgos | |
| 2018/0014791 A1 | 1/2018 | Montgomery et al. | |
| 2018/0020991 A1 | 1/2018 | Aung et al. | |
| 2018/0049649 A1 | 2/2018 | Addison et al. | |
| 2018/0249916 A1 | 9/2018 | Bienek et al. | |
| 2018/0256043 A1* | 9/2018 | Melker | A61H 31/006 |
| 2018/0303434 A1* | 10/2018 | Selvaraj | A61B 5/6801 |
| 2021/0121077 A1* | 4/2021 | Lee | A61B 5/0006 |
| 2021/0386301 A1* | 12/2021 | Hoshino | A61B 5/14553 |

OTHER PUBLICATIONS

Tsalach et al., "Cerebral Autoregulation Real-Time Monitoring," Public Library of Science, PLOS ONE, Aug. 29, 2016, 14 pp.

Scheeran et al., "Journal of Clinical Monitoring and Computing 2016 End of Year Summary: Monitoring Cerebral Oxygenation and Autoregulation," Journal of Clinical Monitoring and Computing, vol. 31, Jan. 27, 2017, pp. 241-246.

Chuan et al., "Is Cerebrovascular Autoregulation Associated with Outcomes After Major Noncardiac Surgery? A Prospective Observational Pilot Study," Acta Anesthesiologica Scandinavica, Jul. 11, 2018, 10 pp.

U.S. Appl. No. 15/962,438, filed Apr. 25, 2018, by Addison et al.

* cited by examiner

DETERMINING ARTERIAL PRESSURES

TECHNICAL FIELD

This disclosure related to monitoring autoregulation status of a patient.

BACKGROUND

Clinicians may monitor one or more physiological parameters of a patient, e.g., blood pressure. In some examples, blood pressure may be used to monitor a patient's cerebral autoregulation status. Cerebral autoregulation is the response mechanism by which an organism regulates cerebral blood flow over a wide range of systemic blood pressure changes through complex myogenic, neurogenic, and metabolic mechanisms. During autoregulation, cerebral arterioles dilate or constrict in an attempt to maintain appropriate blood flow. For example, as cerebral pressure decreases, cerebral arterioles dilate in an attempt to maintain blood flow. As cerebral pressure increases, cerebral arterioles constrict to reduce the blood flow that could cause injury to the brain.

SUMMARY

This disclosure describes devices, systems, and techniques related to determining characteristic arterial pressure (CAP) values based on blood pressure signals received from a patient. For example, the CAP values may be determined based on a derivative of a blood pressure signal. In some examples, a system may determine an autoregulation status of a patient based on the determined CAP value.

In some examples, a method may include receiving, by processing circuitry, a blood pressure signal indicative of a blood pressure of a patient; determining, by the processing circuitry, a derivative of at least a portion of the blood pressure signal; determining, by the processing circuitry and based on the derivative, a characteristic arterial pressure (CAP) value of the blood pressure signal; determining, by the processing circuitry and based on the CAP value, an autoregulation value of the patient; and outputting, by the processing circuitry, a signal indicative of the autoregulation value of the patient.

In some examples, a system may include processing circuitry configured to receive a blood pressure signal indicative of a blood pressure of a patient; determine a derivative of at least a portion of the blood pressure signal; determine, based on the derivative, a characteristic arterial pressure (CAP) value; determine, based on the CAP value, an autoregulation value of the patient; and output a signal indicative of the autoregulation value of the patient.

In some examples, a non-transitory computer readable storable medium may include instructions that, when executed, cause processing circuitry to: receive a blood pressure signal indicative of a blood pressure of a patient; determine a derivative of at least a portion of the blood pressure signal; determine, based on the derivative, a characteristic blood pressure (CAP) value; determine, based on the CAP value, an autoregulation value of the patient; and output a signal indicative of the autoregulation value of the patient.

The details of one or more examples are set forth in the accompanying drawings and the description below. Other features, objects, and advantages will be apparent from the description and drawings, and from the claims.

DETAILED DESCRIPTION

Figure 1:
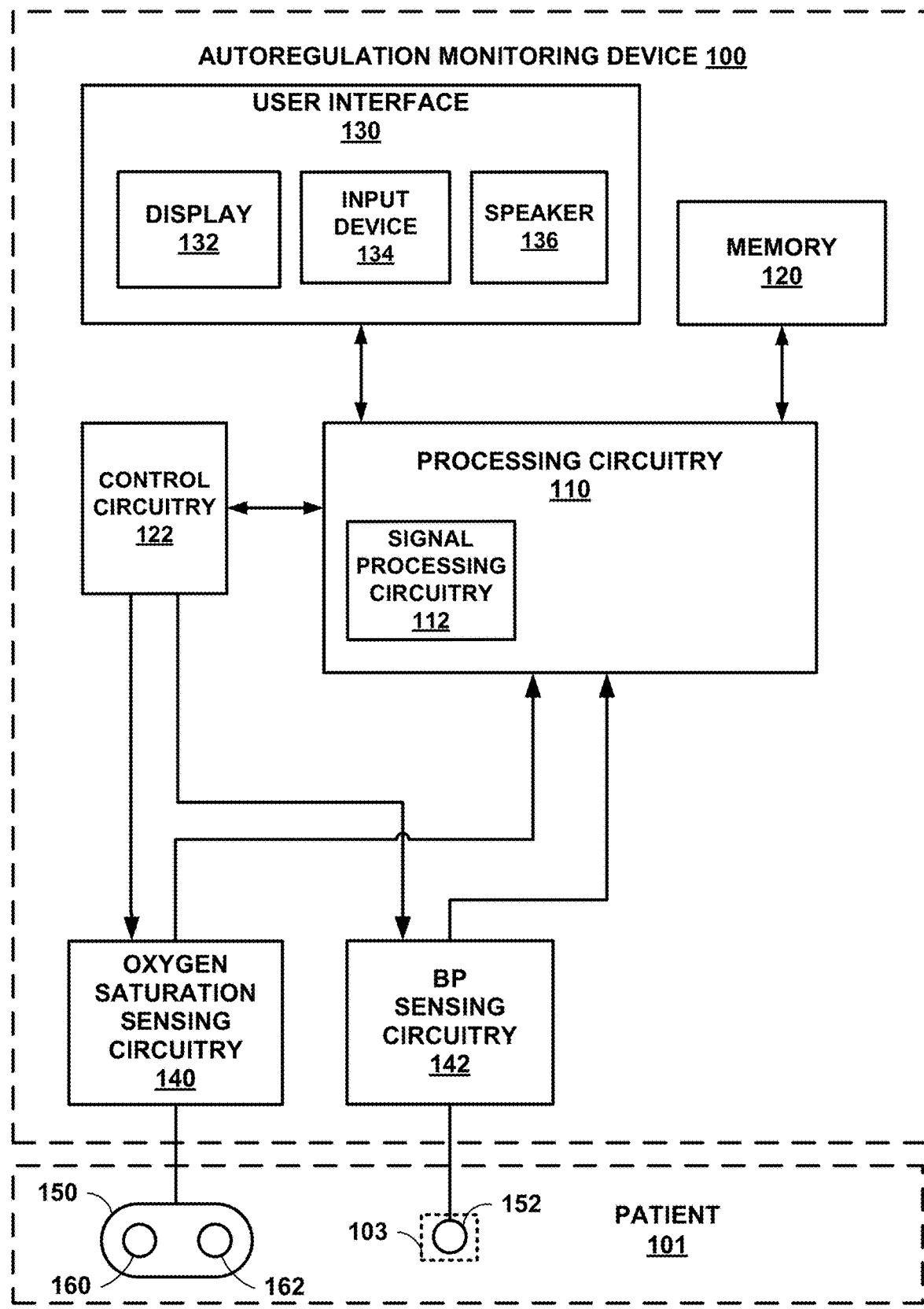
FIG. 1 is a conceptual block diagram illustrating an example autoregulation monitoring system.

The present disclosure describes devices, systems, and techniques for determining a characteristic arterial pressure (CAP) of a patient. In some examples, a system may use the CAP to determine an autoregulation value, and in some examples an autoregulation status, of the patient. An intact autoregulation status of a patient occurs over a range of blood pressures defined between a lower limit of autoregulation ("LLA") and an upper limit of autoregulation ("ULA"). An impaired autoregulation status occurs outside of the range of blood pressures defined between the LLA and the ULA and may occur when a patient's autoregulation process is not functioning properly. When a patient exhibits an impaired autoregulation status, the patient may experience inappropriate cerebral blood flow, which may be undesirable. For example, a drop in cerebral blood flow may cause ischemia, which may adversely affect brain cells. An increase in cerebral blood flow may cause hyperemia, which may result in swelling of the brain or edema. A clinician may monitor the autoregulation status of a patient, e.g., during a medical procedure, and take one or more actions to keep the patient in or bring the patient to an intact autoregulation status, such as by increasing or decreasing the patient's blood pressure.

A device configured to monitor an autoregulation status of a patient may determine the autoregulation status based on various physiological parameters of the patient, such as a blood pressure signal indicative of a blood pressure of a patient and an oxygen saturation signal indicative of blood oxygen saturation (e.g., regional oxygen saturation, $rSO_2$) of a patient. For example, mean arterial pressure (MAP) may be derived from an arterial line blood pressure measurement and correlated with a cerebral oxygen saturation ($rSO_2$) to determine a correlation index (COx) from which ULA, LLA, and/or a target blood pressure (TBP) may be determined. In some examples, $rSO_2$ may be a proxy for cerebral blood flow. In some examples, one or more other measures or proxies for cerebral blood flow may be used.

MAP values are typically determined by averaging measured blood pressures. For example, the MAP values may be calculated as an average of the systolic (e.g., highest) measured blood pressure per cardiac cycle and the diastolic (e.g., lowest) measured blood pressure per cycle. However, measurements of blood pressure values may be sensitive to noise in a blood pressure signal or intra-beat morphology of blood pressure waveforms. For example, noise in a blood pressure signal may be due to limitations of a blood pressure sensing devices, movement of the blood pressure sensing device, or the like. Intra-beat morphology of blood pressure waveforms may vary due to, for example, the physiology of the cardiovascular system of the patient, such as reflections of pressure waves in the arterial tree, changes in blood flow profiles or patterns, the position and/or orientation of the patient's body which may result in a different in hydrostatic pressures, or the like. In this manner, these variations in measured pressures at the high and low points of the cardiac cycle may result in inaccurate MAP values and/or MAP values that fluctuate between cycles and do not reflect actual MAP values for the patient. However, CAP values may be less affected by noise in the blood pressure signal, intra-beat morphological anomalies, or both compared to other portions of the blood pressure waveform and/or other values representative of a blood pressure of the patient, such as MAP. For calculations that rely on steady arterial pressures, such as autoregulation values, CAP values may provide more reliable artery pressures over time, improved detection of changes to artery pressures, and/or better capture characteristic trends in arterial pressure compared to other blood pressure values, such as MAP.

The devices, systems, and techniques describe determining characteristic arterial pressure (CAP) values based on blood pressure signals received from a patient. The blood pressure signals may be indicative of a blood pressure of a patient, and in some examples, may represent a waveform of blood pressures over time. In some examples, the processing circuitry may determine CAP values based on a derivative of the blood pressure waveform, such as a maximum or minimum of a first derivative of the blood pressure signal (e.g., maximum gradient of the upslope of the blood pressure waveform in the signal). When compared to other portions of the blood pressure signal (e.g., the maximum and minimum pressures), the maximum and/or minimum of a first derivative of the blood pressure signal may be less susceptible to external noise (e.g., least affected by noise), mainly influenced by the initial internal wave making up the pulsatile morphology of the beat and thereby less affected by intra-beat morphology changes due to the summation of subsequent internal waves (e.g., blood pressure waveform morphological anomalies), or both. In this way, CAP may be a more reliable indicator of a blood pressure of a patient over time than other values representative of blood pressure, such as mean arterial pressure (MAP).

The processing circuitry may determine autoregulation values, and the autoregulation status, of the patient based on the determined CAP values. For example, the processing circuitry may determine a metric (e.g., an autoregulation value) indicative of the autoregulation status of the patient based on the CAP value and/or an oxygen saturation signal. In some examples, the metric may be used to determine an LLA, a ULA, or both. The autoregulation status (e.g., whether the patient's autoregulation is intact or impaired) may be determined based whether the blood pressure values are between or outside of the LLA and ULA. For example, the processing circuitry may determine the LLA and/or the ULA based on a correlation index (ChOx) of the CAP and $rSO_2$. The CAP, or some calculation based on the CAP, may be determined as an autoregulation value and compared to the LLA and ULA to determine the autoregulation status (e.g., whether or not the patient's autoregulation is impaired or intact). In this way, the disclosed devices, systems, and techniques may more accurately and reliably determine the autoregulation status of a patient.

Alternatively or additionally, the processing circuitry may determine the LLA and/or the ULA based on other parameters or other correlation coefficients. For example, the LLA and/or the ULA may be determined based on cerebral perfusion pressure, which may be determined based on the CAP and intracranial pressure of the patient. As another example, the processing circuitry may determine the LLA and/or the ULA based on a comparison of a threshold value to a change in the CAP (and/or one or more other measures or proxies of cerebral blood flow, e.g., cerebral oxygen saturation, flow velocity, or the like) of a patient over time, e.g., determining a correlation coefficient only if the change in blood pressure (and/or one or more other measures or proxies of cerebral blood flow) over time exceeds the threshold value. In some examples, as described in commonly assigned U.S. Patent Application Publication No. 2018/0014791 naming inventors Montgomery et al. and entitled, "SYSTEMS AND METHODS OF MONITORING AUTOREGULATION," which is hereby incorporated by reference in its entirety, the processing circuitry may process a blood pressure signal and an oxygen saturation signal to determine respective gradients of the signals (i.e., a blood pressure gradient and an oxygen saturation gradient) over a period of time and determine the patient's autoregulation status based on the respective gradients. As described in U.S. Patent Application Publication No. 2018/0014791, the processing circuitry may determine the autoregulation system of the patient may be impaired if the blood pressure gradient and the oxygen saturation gradient trend together (e.g., change in the same direction) over a period of time. In some cases, the processing circuitry may determine that the autoregulation system of the patient may be intact if the blood pressure gradient and the oxygen saturation gradient do not trend together (e.g., do not change in the same direction, such as change in different directions, or the blood pressure changes while the oxygen saturation remains generally stable) over the period of time.

The processing circuitry may provide a signal indicative of the autoregulation value and/or autoregulation status of the patient to an output device to enable a clinician to monitor the autoregulation status of the patient. The output device can provide, for example, a visual output, an audio output, a somatosensory output, or any combination thereof, that provides information indicative of the autoregulation status of the patient to a user.

The devices, systems, and techniques of this disclosure may operate to increase the accuracy of the presentation of an estimate of a limit of autoregulation of a patient and the presentation of an indication of the autoregulation status of the patient. For example, using the CAP may improve the determination of the autoregulation status of the patient compared to using compared to other portions of the blood pressure waveform or other values representative of blood pressure such as the MAP, because the CAP may be less sensitive to noise, blood pressure waveform morphological anomalies, or both. The presentation of more accurate information may result in more informed decision making by the clinician, compared to autoregulation monitoring systems that do not use CAP to determine autoregulation status.

While aspects of the present disclosure are discussed with reference to CAP and $rSO_2$ correlations, such as ChOx, it should be noted that in other examples, other signals may be determined to help evaluate a patient's autoregulation status, such as one or more other measures or proxies of blood pressure and cerebral blood flow. For example, the processing circuitry may determine whether the autoregulation system of the patient is intact based on a trend between the blood oxygen saturation of the patient and the blood pressure of the patient, as described above. As another example, the processing circuitry may monitor the patient's autoregulation by correlating measurements of the patient's blood pressure with measurements of the patient's blood volume (BVS) and by determining an estimate of the limit of cerebral autoregulation based on the BVS values (LABVS). The processing circuitry can determine a hemoglobin volume index (HVx) based at least in part on a linear correlation between the patient's blood pressure and blood volume. The processing circuitry can then determine an estimate of the limit of cerebral autoregulation based on the HVx values (LAHVx). The processing circuitry may also determine various other linear correlations or statistical based measures (e.g., statistical data clustering techniques) to help evaluate a patient's autoregulation status, such as a linear correlation between measurements of a patient's blood pressure and measurements of a patient's cerebral blood flow known as a mean velocity index (Mx). The processing circuitry may also determine a linear correlation between measurements of a patient's blood pressure and measurements of a patient's intracranial pressure known as a pressure reactivity index (PRx). COx may be a proxy for Mx, and HVx may be a proxy for PRx.

Other systems and techniques using similar or different parameters may be used to determine a limit of autoregulation. For example, as described in commonly assigned U.S. Patent Application Publication No. 2017/0105631 filed on Oct. 18, 2016, entitled "Systems and Method for Providing Blood Pressure Safe Zone Indication During Autoregulation Monitoring," and U.S. Patent Application Publication No. 2017/0105631 filed on Oct. 18, 2016, entitled "System and Method for Providing Blood Pressure Safe Zone Indication During Autoregulation Monitoring," systems and methods for monitoring autoregulation may use an autoregulation index to generate and display an autoregulation profile (e.g., autoregulation index values sorted into bins corresponding to different blood pressure ranges) of the patient, and generate a blood pressure (BP) safe zone (e.g., designate a blood pressure range encompassing one or more of the bins) indicative of intact autoregulation. As another example, as described in commonly assigned U.S. Patent Application Publication No. 2016/0367197 filed on Jun. 6, 2016, entitled "Systems and Methods for Reducing Signal Noise When Monitoring Autoregulation," systems and methods for monitoring autoregulation may determine linear correlations between measured physiological parameters using regression analyses, such as a least median of squares (LMS) regression method or a least trimmed squares regression method (LTS), applied to oxygen saturation measurements plotted against blood pressure measurements to determine a regression line associated with COx to ignore or exclude data outliers representative of the noise, and to utilize the remaining data to determine the COx or HVx.

FIG. 1 is a conceptual block diagram illustrating an example autoregulation monitoring system 100. Autoregulation monitoring system 100 includes processing circuitry 110, memory 120, control circuitry 122, user interface 130, sensing circuitry 140 and 142, and sensing devices 150 and 152. In the example illustrated in FIG. 1, user interface 130 includes display 132, input device 134, and speaker 136, which may be any suitable audio device configured to generate and output a noise. In some examples, autoregulation monitoring system 100 may be configured to determine and display the cerebral autoregulation status of a patient 101, e.g., during a medical procedure or for more long-term monitoring, such as fetal monitoring. A clinician may receive information regarding the cerebral autoregulation status of a patient via user interface 130 and adjust treatment or therapy to patient 101 based on the cerebral autoregulation status information. Although FIG. 1 is described with respect to the example of autoregulation monitoring, FIG. 1 may be modified to generally determine CAP as described herein or monitor other patient processes that may benefit from using CAP.

Processing circuitry 110, as well as other processors, processing circuitry, controllers, control circuitry, and the like, described herein, may include one or more processors. Processing circuitry 110 may include any combination of integrated circuitry, discrete logic circuitry, analog circuitry, such as one or more microprocessors, digital signal processors (DSPs), application specific integrated circuits (ASICs), or field-programmable gate arrays (FPGAs). In some examples, processing circuitry 110 may include multiple components, such as any combination of one or more microprocessors, one or more DSPs, one or more ASICs, or one or more FPGAs, as well as other discrete or integrated logic circuitry, and/or analog circuitry.

Control circuitry 122 may be operatively coupled processing circuitry 110. Control circuitry 122 is configured to control an operation of sensing devices 150 and 152. In some examples, control circuitry 122 may be configured to provide timing control signals to coordinate operation of sensing devices 150 and 152. For example, sensing circuitry 140 and 142 may receive from control circuitry 122 one or more timing control signals, which may be used by sensing circuitry 140 and 142 to turn on and off respective sensing devices 150 and 152. In some examples, processing circuitry 110 may use the timing control signals to operate synchronously with sensing circuitry 140 and 142. For example, processing circuitry 110 may synchronize the operation of an analog-to-digital converter and a demultiplexer with sensing circuitry 140 and 142 based on the timing control signals.

Memory 120 may be configured to store, for example, monitored physiological parameter values (including acquired blood pressure values and/or oxygen saturation values), blood pressure waveforms, derivative of portions of blood pressure waveforms, CAP values, ChOx values, COx values, BVS values, HVx values, value(s) of an LLA and/or a ULA, determined autoregulation statuses, or any combination thereof. Memory 120 may also be configured to store data, such as one or more look-up tables or equations defining one or more associations (e.g., relationships) between stored data, such as, for example, blood pressure values and derivatives of portions of blood pressure waveforms or derivatives of blood pressure waveforms and CAP values.

In some examples, memory 120 may store program instructions, such as one or more algorithms to determine derivatives of blood pressure waveforms, metrics indicative of autoregulation status, or other parameters and/or correlations described herein. The program instructions may include one or more program modules that are executable by processing circuitry 110. When executed by processing circuitry 110, such program instructions may cause processing circuitry 110 to provide the functionality ascribed to it herein. The program instructions may be embodied in software, firmware, and/or RAMware. Memory 120 may include any one or more of volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media.

User interface 130 may include a display 132, an input device 134, and a speaker 136. In some examples, user interface 130 may include fewer or additional components. User interface 130 is configured to present information to a user (e.g., a clinician). For example, user interface 130 and/or display 132 may include a monitor, cathode ray tube display, a flat panel display such as a liquid crystal (LCD) display, a plasma display, a light emitting diode (LED) display, and/or any other suitable display. In some examples, user interface 130 may be part of a multiparameter monitor (MPM) or other physiological signal monitor used in a clinical or other setting, a personal digital assistant, mobile phone, tablet computer, laptop computer, any other suitable computing device, or any combination thereof, with a built-in display or a separate display.

In some examples, processing circuitry 110 may be configured to control a user interface 130, such as display 132, to present a graphical user interface to a user. The graphical user interface may include indications of values of one or more physiological parameters of a patient, such as, for example, blood pressure values, oxygen saturation values, CAP values, information about an autoregulation status (e.g., cerebral autoregulation status), pulse rate information, respiration rate information, other patient physiological parameters, or combinations thereof via display 132. User interface 130 may also include means for projecting audio to a user, such as speaker 136.

In some examples, processing circuitry 110 may also receive input signals from additional sources (not shown), such as a user. For example, processing circuitry 110 may receive from input device 134, such as a keyboard, a mouse, a touch screen, buttons, switches, a microphone, a joystick, a touch pad, or any other suitable input device or combination of input devices, an input signal. The input signal may contain information about patient 101, such as physiological parameters, treatments provided to patient 101, or the like. Additional input signals may be used by processing circuitry 110 in any of the determinations or operations it performs in accordance with processing circuitry 110.

In some examples, if processing circuitry 110 determines that the autoregulation status of patient 101 is impaired, then processing circuitry 110 may present a notification indicating the impaired cerebral autoregulation status. The notification may include a visual, audible, tactile, or somatosensory notification (e.g., an alarm signal) indicative of an autoregulation status of patient 101. In some examples, processing circuitry 110 and user interface 130 may be part of the same device or supported within one housing (e.g., a computer or monitor). In other examples, processing circuitry 110 and user interface 130 may be separate devices configured to communicate through a wired connection or a wireless connection.

Sensing circuitry 140 and 142 may be configured to receive physiological signals sensed by respective sensing devices 150 and 152 and communicate the physiological signals to processing circuitry 110. Sensing devices 150 and 152 may include any sensing hardware configured to sense a physiological parameter of a patient, such as, but not limited to, one or more electrodes, optical receivers, blood pressure cuffs, or the like. The sensed physiological signals may include signals indicative of physiological parameters from a patient, such as, but not limited to, blood pressure, regional oxygen saturation, blood volume, heart rate, and respiration. For example, sensing circuitry 140 and 142 may include, but are not limited to, blood pressure sensing circuitry, oxygen saturation sensing circuitry, blood volume sensing circuitry, heart rate sensing circuitry, temperature sensing circuitry, electrocardiography (ECG) sensing circuitry, electroencephalogram (EEG) sensing circuitry, or any combination thereof.

In some examples, sensing circuitry 140 and 142 and/or processing circuitry 110 may include signal processing circuitry 112 configured to perform any suitable analog conditioning of the sensed physiological signals. For example, sensing circuitry 140 and 142 may communicate to processing circuitry 110 an unaltered (e.g., raw) signal. Processing circuitry 110, e.g., signal processing circuitry 112, may be configured to modify a raw signal to a usable signal by, for example, filtering (e.g., low pass, high pass, band pass, notch, or any other suitable filtering), amplifying, performing an operation on the received signal (e.g., taking a derivative, averaging), performing any other suitable signal conditioning (e.g., converting a current signal to a voltage signal), or any combination thereof. In some examples, the conditioned analog signals may be processed by an analog-to-digital converter of signal processing circuitry 112 to convert the conditioned analog signals into digital signals. In some examples, signal processing circuitry 112 may operate on the analog or digital form of the signals to separate out different components of the signals. In some examples, signal processing circuitry 112 may perform any suitable digital conditioning of the converted digital signals, such as low pass, high pass, band pass, notch, averaging, or any other suitable filtering, amplifying, performing an operation on the signal, performing any other suitable digital conditioning, or any combination thereof. In some examples, signal processing circuitry 112 may decrease the number of samples in the digital detector signals. In some examples, signal processing circuitry 112 may remove dark or ambient contributions to the received signal. Additionally, or alternatively, sensing circuitry 140 and 142 may include signal processing circuitry 112 to modify one or more raw signals and communicate to processing circuitry 110 one or more modified signals.

Oxygen saturation sensing device 150 is configured to generate an oxygen saturation signal indicative of blood oxygen saturation within the venous, arterial, and/or capillary systems within a region of patient 101. For example, oxygen saturation sensing device 150 may be configured to be placed on the skin of patient 101 to determine regional oxygen saturation of a particular tissue region. In some examples, the tissue region may include the frontal cortex or another cerebral location of patient 101. Oxygen saturation sensing device 150 may include emitter 160 and detector 162. Emitter 160 may include at least two light emitting diodes (LEDs), each configured to emit at different wavelengths of light, e.g., red or near infrared light. As used herein, the term "light" may refer to energy produced by radiative sources and may include any wavelength within one or more of the ultrasound, radio, microwave, millimeter wave, infrared, visible, ultraviolet, gamma ray or X-ray electromagnetic radiation spectra. In some examples, light drive circuitry (e.g., within sensing device 150, sensing circuitry 140, control circuitry 122, and/or processing circuitry 110) may provide a light drive signal to drive emitter 160 and to cause emitter 160 to emit light. In some examples, the LEDs of emitter 160 emit light in the range of about 600 nanometers (nm) to about 1000 nm. In a particular example, one LED of emitter 160 is configured to emit light at about 730 nm and the other LED of emitter 160 is configured to emit light at about 810 nm. Other wavelengths of light may be used in other examples.

Detector 162 may include a first detection element positioned relatively "close" (e.g., proximal) to emitter 160 and a second detection element positioned relatively "far" (e.g., distal) from emitter 160. In some examples, the first detection elements and the second detection elements may be chosen to be specifically sensitive to the chosen targeted energy spectrum of light source 160. Light intensity of multiple wavelengths may be received at both the "close" and the "far" detector 162. For example, if two wavelengths are used, the two wavelengths may be contrasted at each location and the resulting signals may be contrasted to arrive at an oxygen saturation value that pertains to additional tissue through which the light received at the "far" detector passed (tissue in addition to the tissue through which the light received by the "close" detector passed, e.g., the brain tissue), when it was transmitted through a region of a patient (e.g., a patient's cranium). In operation, light may enter detector 162 after passing through the tissue of patient 101, including skin, bone, other shallow tissue (e.g., non-cerebral tissue and shallow cerebral tissue), and/or deep tissue (e.g., deep cerebral tissue). Detector 162 may convert the intensity of the received light into an electrical signal. The light intensity may be directly related to the absorbance and/or reflectance of light in the tissue. Surface data from the skin and skull may be subtracted out, to generate an oxygen saturation signal for the target tissues over time.

Oxygen saturation sensing device 150 may provide the oxygen saturation signal to processing circuitry 110 or to any other suitable processing device to enable evaluation of an autoregulation status of patient 101. Additional example details of determining oxygen saturation based on light signals may be found in commonly assigned U.S. Pat. No. 9,861,317, which issued on Jan. 9, 2018, and is entitled "Methods and Systems for Determining Regional Blood Oxygen Saturation."

In operation, blood pressure sensing device 152 and oxygen saturation sensing device 150 may each be placed on the same or different parts of the body of patient 101. For example, blood pressure sensing device 152 and oxygen saturation sensing device 150 may be physically separate from each other and may be separately placed on patient 101. As another example, blood pressure sensing device 152 and oxygen saturation sensing device 150 may in some cases be part of the same sensor or supported by a single sensor housing. For example, blood pressure sensing device 152 and oxygen saturation sensing device 150 may be part of an integrated oximetry system configured to non-invasively measure blood pressure (e.g., based on time delays in a plethysmography (PPG) signal) and regional oxygen saturation. One or both of blood pressure sensing device 152 or oxygen saturation sensing device 150 may be further configured to measure other parameters, such as hemoglobin, respiratory rate, respiratory effort, heart rate, saturation pattern detection, response to stimulus such as bispectral index (BIS) or electromyography (EMG) response to electrical stimulus, or the like. While an example autoregulation monitoring system 100 is illustrated in FIG. 1, the described components are not intended to be limiting. Additional or alternative components and/or implementations may be used in other examples.

Blood pressure sensing device 152 may be any sensor or device configured to generate a blood pressure signal indicative of an acquisition blood pressure of patient 101 at acquisition site 103. For example, blood pressure sensing device 152 may include a blood pressure cuff configured to non-invasively monitoring blood pressure, a sensor configured to noninvasively generate a PPG signal, or an arterial line for invasively monitoring blood pressure in an artery of patient 101. In some examples, the blood pressure signal may include at least a portion of a waveform of the acquisition blood pressure. In some examples, acquisition site 103 may include at least one of a femoral artery of patient 101, a radial artery of patient 101, a dorsalis pedis artery of patient 101, a brachial artery of patient 101, or combinations thereof. In some examples, blood pressure sensing device 152 may include a plurality of blood pressure sensing devices. For example, each blood pressure sensing device of the plurality of blood pressure sensing devices may be configured to obtain a respective blood pressure of patient 101 at a respective acquisition site of a plurality of acquisition sites. The plurality of acquisition sites may include similar or different arteries of patient 101.

In some examples, blood pressure sensing device 152 may include one or more pulse oximetry sensors. The acquisition blood pressure may be derived by processing time delays between two or more characteristic points within a single PPG signal obtained from a single pulse oximetry sensor. Additional example details of deriving blood pressure based on a comparison of time delays between certain components of a single PPG signal obtained from a single pulse oximetry sensor are described in commonly assigned U.S. Patent Application Publication No. 2009/0326386 filed Sep. 30, 2008, and entitled "Systems and Methods for Non-Invasive Blood Pressure Monitoring." In other cases, the blood pressure of patient 101 may be continuously, non-invasively monitored via multiple pulse oximetry sensors placed at multiple locations on patient 101. As described in commonly assigned U.S. Pat. No. 6,599,251, issued Jul. 29, 2003, and entitled "Continuous Non-invasive Blood Pressure Monitoring Method and Apparatus." multiple PPG signals may be obtained from the multiple pulse oximetry sensors, and the PPG signals may be compared against one another to estimate the blood pressure of patient 101.

Regardless of its form, blood pressure sensing device 152 may be configured to generate a blood pressure signal (also referred to herein as an acquired blood pressure signal) indicative of an acquisition blood pressure of patient 101 at acquisition site 103 (e.g., arterial blood pressure) over time. In examples in which blood pressure sensing device 152 includes a plurality of blood pressure sensing devices, the blood pressure signal may include a plurality of blood pressure signals, each indicative of a blood pressure of patient 101 at a respective acquisition site. Blood pressure sensing device 152 may provide the blood pressure signal to sensing circuitry 142, processing circuitry 110, or to any other suitable processing device to enable evaluation of the autoregulation status of patient 101.

Processing circuitry 110 may be configured to receive one or more signals generated by sensing devices 150 and 152 and sensing circuitry 140 and 142. The physiological signals may include a blood pressure signal indicative of a blood pressure of patient 101 and/or an oxygen saturation signal indicative of an oxygen saturation of patient 101. For example, processing circuitry 110 may receive the blood pressure signal indicative of the blood pressure waveform of at acquisition site 103 of patient 101 from blood pressure sensing device 152 (e.g., via blood pressure sensing circuitry 142).

Processing circuitry 110 may be configured to determine CAP values based on the blood pressure signal. In some examples, determining the derivative may include determining, by processing circuitry 110, a subset of data points from the blood pressure signal. For example, the blood pressure signal may include a plurality of data points, each data point corresponding to a respective blood pressure and time. In some examples, the subset of data points may represent selected region of a blood pressure waveform, such as, for example, the systolic upstroke, the systolic peak pressure, the systolic decline, the dicrotic notch, the diastolic runoff, and/or the end-diastolic pressure. For example, processing circuitry 110 may be configured to select a respective subset of data points included within a time window corresponding to approximately one cardiac cycle. In examples in which the respective subset of data points includes a lowest blood pressure value at a first (earlier) time, a highest blood pressure value at a second (later) time, and a series of intervening data points, the respective subset of data points may include the systolic upstroke. In examples in which the respective subset of data points includes a highest blood pressure value at a first (earlier) time, a lowest blood pressure value at a second (later) time, and a series of intervening data points, the respective subset of data point may include the diastolic runoff. By selecting a time window, processing circuitry 110 may exclude data points of the blood pressure signal that may include errors, such as noise or morphological anomalies, as discussed above.

In some examples, processing circuitry 110 may determine the derivative by determining a rate of change and/or direction of change of the data between consecutive data points of the subset of data points based within the selected time window. For example, a large positive rate of change (e.g., compared to rates of change of adjacent data points) may correspond to the systolic upstroke, whereas a large negative rate of change (e.g., compared to rates of change of adjacent data points) may correspond to the diastolic runoff. In some examples, processing circuitry 110 may compare the determined rates of change. In some examples, processing circuitry 110 may identify the greatest rate of change. In this way, processing circuitry 110 may determine a maximum or minimum of a derivative of the blood pressure waveform based on determined rates of change of a subset of data point within a selected time window.

In some examples, determining the derivative may include a determining, by processing circuitry 110, a function representative of at least a portion of the blood pressure waveform. The function may include any suitable function, such as, for example, a polynomial function. For example, processing circuitry 110 may determine a polynomial function for a subset of data, as discussed above. In some examples, processing circuitry 110 may determine a derivative of the determined polynomial function. In some examples, processing circuitry 110 may determine minima and/or maxima of the determined derivative.

After determining the derivative, processing circuitry 110 may determine a CAP value based on the derivative, e.g., the minima and/or maxima of the derivative. For example, processing circuitry 110 may determine the CAP as the blood pressure at the time corresponding to the determined minima and/or maxima of the derivative. In some examples, determining the CAP may include interpolation of two or more blood pressure waveform data points adjacent to the time corresponding to the determined derivative.

In some examples, processing circuitry 110 may determine a plurality of CAP values. For example, processing circuitry 110 may determine a CAP value for selected blood pressure waveforms of the signal corresponding to each cardiac cycle (i.e., heartbeat). In some examples, the selected blood pressure waveforms may include each consecutive blood pressure waveform corresponding to a respective cardiac cycle. In some examples, the selected blood pressure waveforms may exclude selected blood pressure waveforms, such as, for example, every other blood pressure waveform corresponding to a respective cardiac cycle or blood pressure waveforms that include noise or morphological anomalies.

After determining the CAP value, processing circuitry 110 may determine a metric (e.g., a numerical value or qualitative information such as an autoregulation value) related to or indicative of the autoregulation status of patient 101 based on the CAP value and the oxygen saturation signal. In some examples, processing circuitry 110 may determine a correlation index (e.g., ChOx) based on the determined CAP value and the measured oxygen saturation value or other measure of autoregulation. In some examples, processing circuitry 110 may determine a metric (e.g., a numerical value or qualitative information such as an autoregulation value) related to or indicative of the autoregulation status of patient 101 based on co-trending of the CAP value and oxygen saturation signal. For example, processing circuitry 110 may determine a gradient of one or more CAP values over a period of time and determine a gradient of the oxygen saturation signal (e.g., including one or more oxygen saturation values) over the period of time. Processing circuitry 110 may determine, based on the gradient of the one or more CAP values (the CAP gradient) and the gradient of the oxygen saturation signal, the autoregulation status of the patient. For example, processing circuitry 110 may determine that the autoregulation system of the patient may be impaired if the CAP gradient and the oxygen saturation gradient trend together (e.g., change in the same direction) over the period of time. Processing circuitry 110 may determine that the autoregulation system of the patient may be intact if the CAP gradient and the oxygen saturation gradient do not trend together (e.g., do not change in the same direction, such as change in different directions, or the one or more CAP values change while the oxygen saturation values remain generally stable) over the period of time. In other examples, processing circuitry 110 may determine the ChOx based on additional or alternative physiological parameters (e.g., physiological signals), such as, for example, a blood volume value or a gradients measure. Processing circuitry 110 may then determine an estimate of an LLA based on the lowest CAP at which the ChOx is less than a threshold value, such as 0.5, 0.4, 0.3, 0.2, 0.1, or 0.0. The threshold value may indicate correlation between blood pressure and $rSO_2$ (and/or one or more other measures or proxies of cerebral blood flow), where a value of 1 would indicate high correlation and a value of 0 indicates no correlation. Low correlation indicates intact autoregulation because the patient's vasculature is able to provide oxygen saturation at a variety of blood pressure levels (see FIG. 5). Using this threshold value, processing circuitry 110 can determine where there is a distinct change in a correlation between the CAP and the oxygen saturation. Such as, for example, with an oxygen saturation versus CAP curve. This distinct change may correspond to a distinct step down in the plot of ChOx versus CAP. Similarly, processing circuitry 110 may determine an estimate of a ULA based on the highest blood pressure value at which the ChOx is less than a threshold value.

Additional example details of determining limits of autoregulation (Las) and cerebral autoregulation status may be found in commonly assigned U.S. Patent Application Publication No. 2018/0014791, filed on Jul. 13, 2017, entitled "Systems and Methods of Monitoring Autoregulation"; commonly assigned U.S. Patent Application Publication No. 2018/0049649 filed on Aug. 1, 2017, entitled "System and Method for Identifying Blood Pressure Zones During Autoregulation Monitoring"; commonly assigned U.S. Patent Application Publication No. 2016/0367197 filed on Dec. 22, 2016, entitled "Systems and Methods of Reducing Signal Noise When Monitoring Autoregulation"; and commonly assigned U.S. patent application Ser. No. 15/962,438 filed on Apr. 25, 2018, entitled "Determining Changes to Autoregulation." In some examples, processing circuitry 110 may determine that a patient has intact autoregulation in response to determining that the blood pressure of patient 101 is greater than an LLA and less than a ULA (e.g., the blood pressure is between the limits of autoregulation).

Once processing circuitry 110 has determined the metric indicative of the autoregulation status of patient 101, processing circuitry 110 may provide information indicative of the autoregulation status of patient 101 to an output device, such as user interface 130. For example, processing circuitry 101 may generate the information based on the metric indicative of the autoregulation status. In some examples, user interface 130, for example, display 132, may present a graphical user interface that includes information indicative of a determined autoregulation status of patient 101 (e.g., an indication of an impaired autoregulation state). In some examples, the indication of autoregulation status may include text, colors, and/or audio presented to a user. Processing circuitry 110 may be further configured to present an indication of one or more limits of autoregulation, blood pressure(s), oxygen saturation(s), or the like, on the graphical user interface. In addition to or instead of the graphical user interface, processor circuitry 110 may be configured to generate and present information indicative of a determined autoregulation status of patient 101 via speaker 136. For example, in response to detecting an impaired autoregulation state of patient 101, processing circuitry 110 may generate an audible alert via speaker 136.

In some examples, autoregulation monitoring device 100, e.g., processing circuitry 110 or user interface 130, may include a communication interface to enable autoregulation monitoring device 100 to exchange information with external devices. The communication interface may include any suitable hardware, software, or both, which may allow autoregulation monitoring device 100 to communicate with electronic circuitry, a device, a network, a server or other workstations, a display, or any combination thereof. For example, processing circuitry 100 may receive blood pressure signals and/or oxygen saturation signals from an external device via the communication interface.

The components of autoregulation monitoring device 100 that are shown and described as separate components are shown and described as such for illustrative purposes only. In some examples the functionality of some of the components may be combined in a single component. For example, the functionality of processing circuitry 110 and control circuitry 122 may be combined in a single processor system. Additionally, in some examples the functionality of some of the components of autoregulation monitoring device 100 shown and described herein may be divided over multiple components. For example, some or all of the functionality of control circuitry 122 may be performed in processing circuitry 110, or sensing circuitry 140 and 142. In other examples, the functionality of one or more of the components may be performed in a different order or may not be required.

Figure 2:
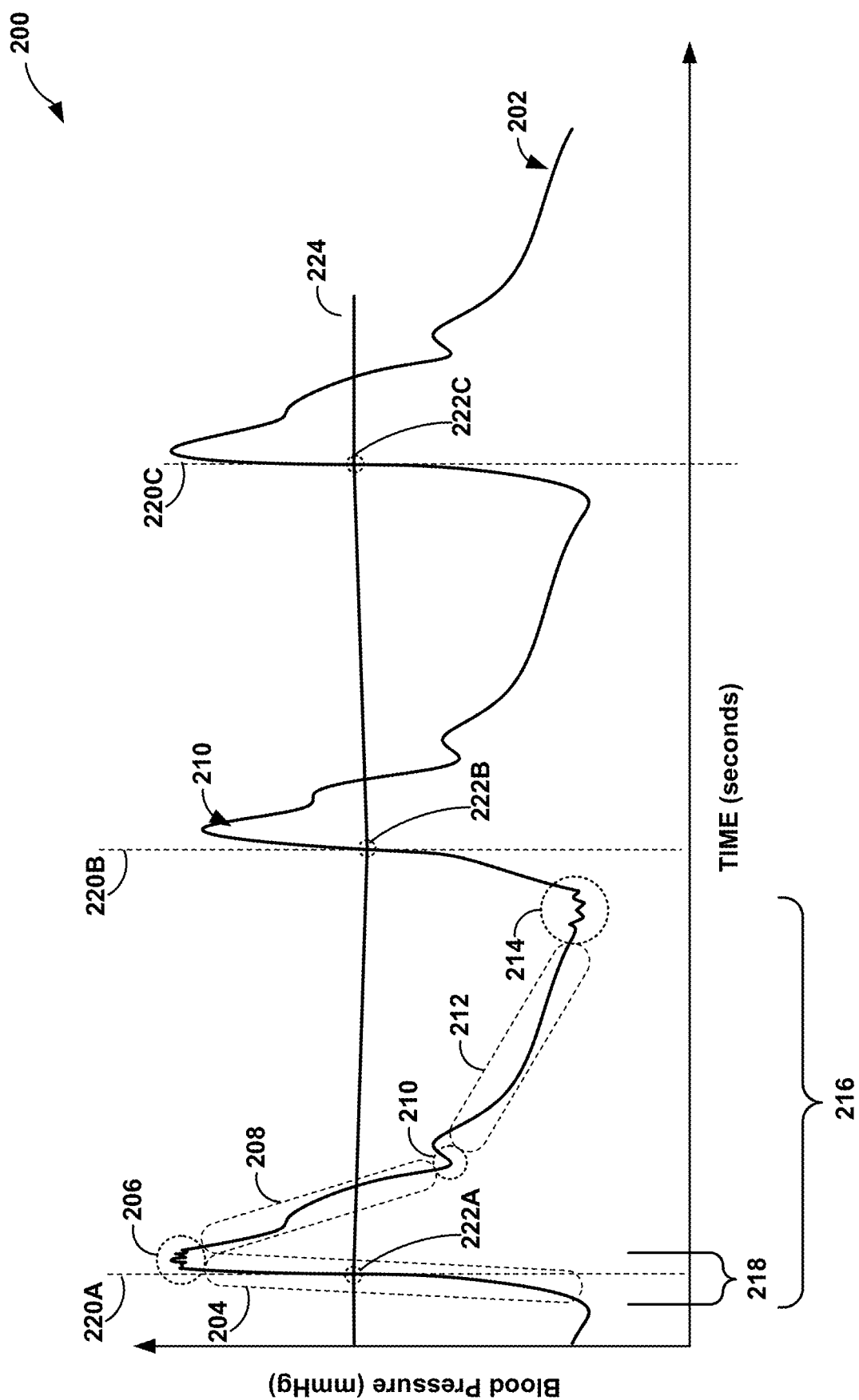
FIG. 2 illustrates an example graph of blood pressure versus time including CAP values determined by an autoregulation monitoring system.

FIG. 2 illustrates an example graph 200 of blood pressure versus time including CAP values determined by an autoregulation monitoring system, such as autoregulation monitoring system 100. In some examples, graph 200 or a similar graphic may be displayed to a clinician, for example, by processing circuitry 110 via user interface 130. In the example illustrated in FIG. 2, blood pressure of a patient (e.g., patient 101) is represented as blood pressure signal 202. Blood pressure signal 202 may have specific shapes and/or features (e.g., the wave form of the blood pressure signal) that include discrete points or sets of points on the waveform, such as, for example, systolic upstroke 204, systolic peak pressure 206, systolic decline 208, dicrotic notch 210, diastolic runoff 212, end-diastolic pressure 214, or any other identifiable region of the waveform. In some examples, one or more identifiable regions of blood pressure signal 202 may include noise, morphological anomalies, or both. For example, systolic peak pressure 206 and end-diastolic pressure 214 include a region of rapid fluctuation in the blood pressure signal due to, for example, limitations of the blood pressure sensing device (e.g., blood pressure sensing device 152).

As discussed above, determining CAP values, e.g., by processing circuitry 110, may include a subset of data points from the blood pressure signal. In some examples, processing circuitry 110 may identify a subset of data points that represent a selected region of a blood pressure waveform, such as, for example, systolic upstroke 204, systolic peak pressure 206, systolic decline 208, dicrotic notch 210, diastolic runoff 212, end-diastolic pressure 214, or any other identifiable region of the waveform. In some examples, processing circuitry 110 may be configured to select a respective subset of data points included within a time window, such as time window 216 corresponding to approximately one cardiac cycle. In some examples, the time window may include only a portion of the blood pressure waveform corresponding to one cardiac cycle, such as, for example, a portion of the blood pressure waveform corresponding to systolic upstroke 204, e.g., systolic upstroke time window 218.

Processing circuitry 110 may determine the derivative of blood pressure signal 202 based on a subset of data points within the time window (e.g., time window 216 or time window 218). In some examples, time window 218 corresponding to systolic upstroke 204 may include the greatest positive derivative of blood pressure signal 202 in time window 216. For example, processing circuitry 110 may determine a function representative of a subset of data points within time window 218. Additionally, or alternatively, processing circuitry 110 may determine a rate of change between consecutive data points of the subset of data points. Processing circuitry 110 may use the function or the determined rates of change to determine a derivative of blood pressure signal 202, such as, for example, a derivative represented by line 220A. Processing circuitry may repeat determining the derivative for a plurality of portions of blood pressure waveform to determine, for example, lines 220B and 220C. After determining lines 220A, 220B, and 220C (collectively, derivatives 220), processing circuitry 110 may determine respective CAP values 222A, 222B, and 222C (collectively, CAP values 222) corresponding to each respective derivative of derivatives 220. For example, processing circuitry 110 may determine the respective blood pressure (e.g., respective CAP value 222) at each respective time corresponding to each respective derivative of derivatives 220 based on interpolation of two or more blood pressure waveform data points adjacent to the respective time. In some examples, processing circuitry 110 may determine CAP curve 224 based on the determined CAP values 222.

Figure 3:
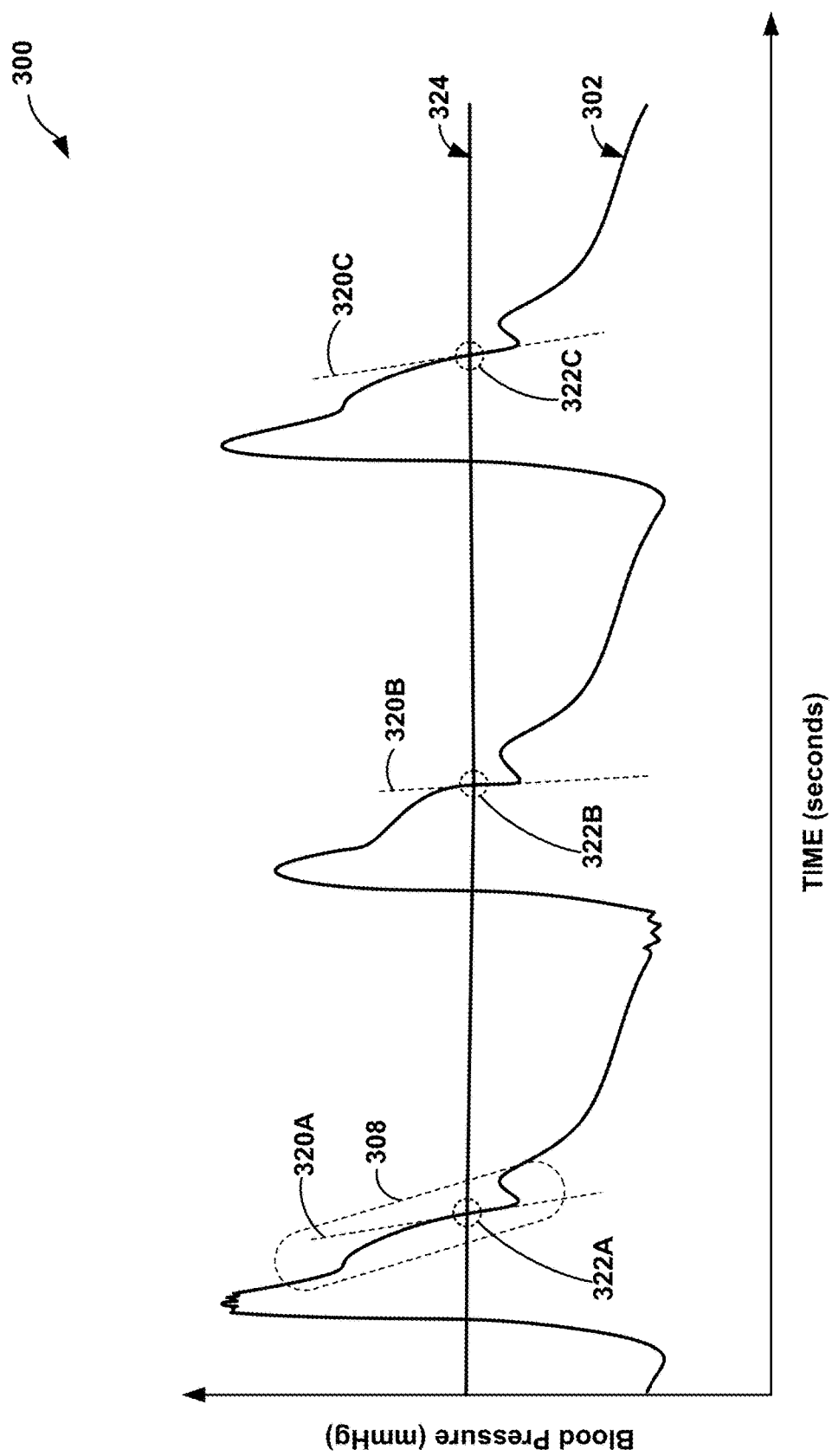
FIG. 3 illustrates an example graph of blood pressure versus time including CAP values determined by an autoregulation monitoring system.

In some examples, CAP values 222 may be determined based on other portions of a blood pressure waveform. FIG. 3 illustrates an example graph 300 of blood pressure versus time including CAP values determined by an autoregulation monitoring system, such as autoregulation monitoring system 100. Graph 300 may be the same or substantially similar to graph 200 discussion in reference to FIG. 2, except for the differences described herein. For example, rather than determining the CAP values using the systolic upstroke, graph 300 illustrates determining lines 220A, 220B, and 220C (collectively, derivatives 220) and CAP values 322A, 322B, and 322C (and/or CAP curve 324) based on blood pressures within systolic decline 308 of blood pressure wave form 302. In some examples, the systolic decline 308 may include the greatest negative derivative of blood pressure waveform 302. In other examples, other portions of a blood pressure waveform or combinations thereof may be used to determine CAP values.

Figure 4:
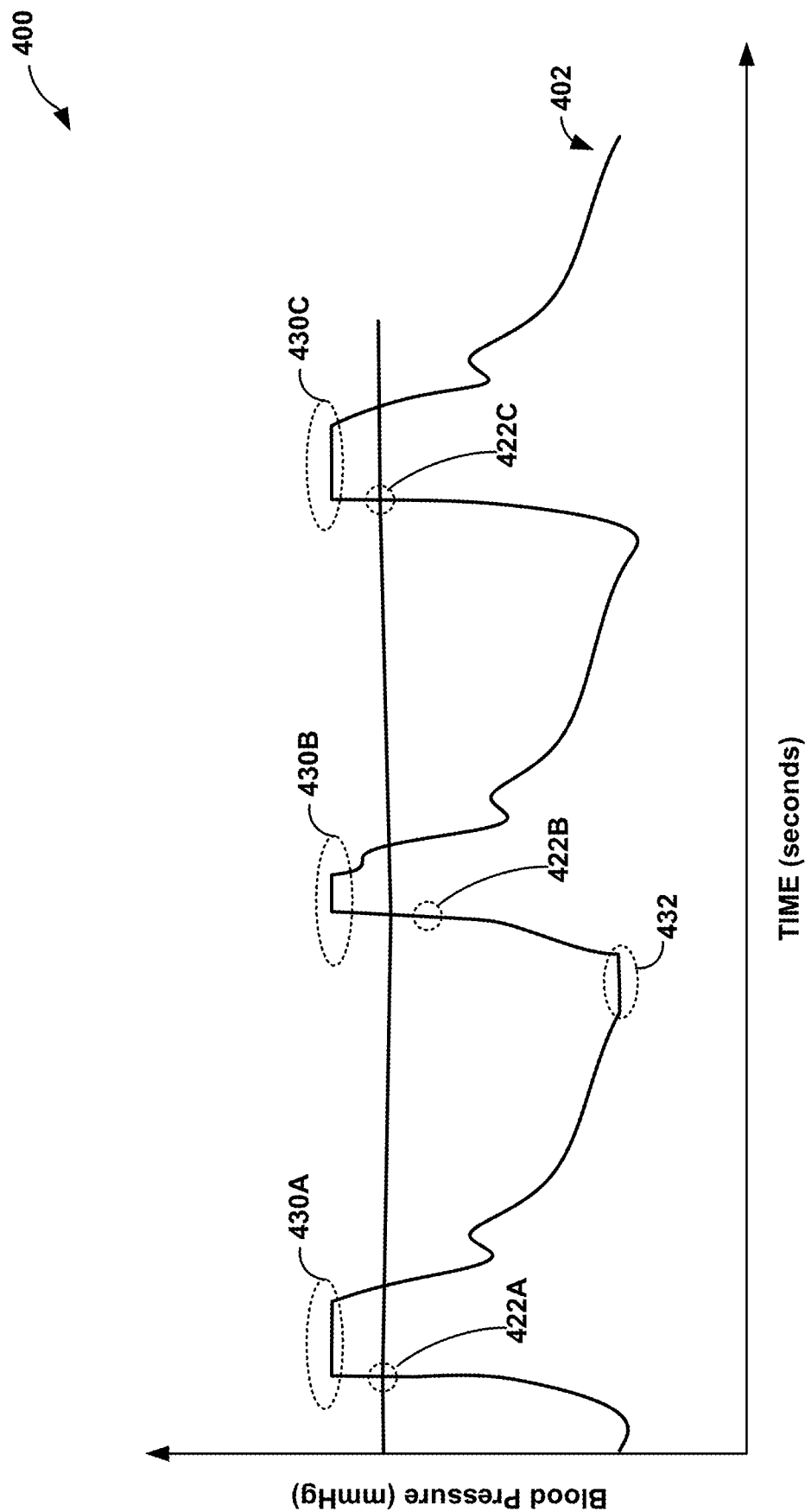
FIG. 4 illustrates an example graph of blood pressure versus time including clipped blood pressure waveform data and CAP values determined by an autoregulation monitoring system.

In some examples, a blood pressure signal may include only part of a blood pressure waveform, such as a "clipped" blood pressure waveform. FIG. 4 illustrates an example graph 400 of blood pressure versus time including clipped blood pressure waveform data and CAP values determined by an autoregulation monitoring system, such as autoregulation monitoring system 100. Graph 400 may be the same or substantially similar to graphs 200 or 300 discussion in reference to FIGS. 2 and 3, except for the differences described herein. For example, blood pressure wave form 402 may be clipped at the upper magnitudes of blood pressure. In some examples, clipped blood pressure wave form 402 may not include systolic peak pressures, e.g., as illustrated by plateau regions 430A, 430B, and 430C, or other regions of blood pressure waveform 402, such as end-diastolic pressure as illustrated by plateau region 432. In some examples, the clipped regions of blood pressure waveform 402 may be due to, for example, error in a blood pressure sensing device, error in blood pressure sensing circuitry, or filtering of a blood pressure signal. Even with the clipped regions of blood pressure waveform 402 processing circuitry 110 may be able to determine CAP values 422A, 422B, and 422C and CAP curve 424 as discussed above.

Figure 5:
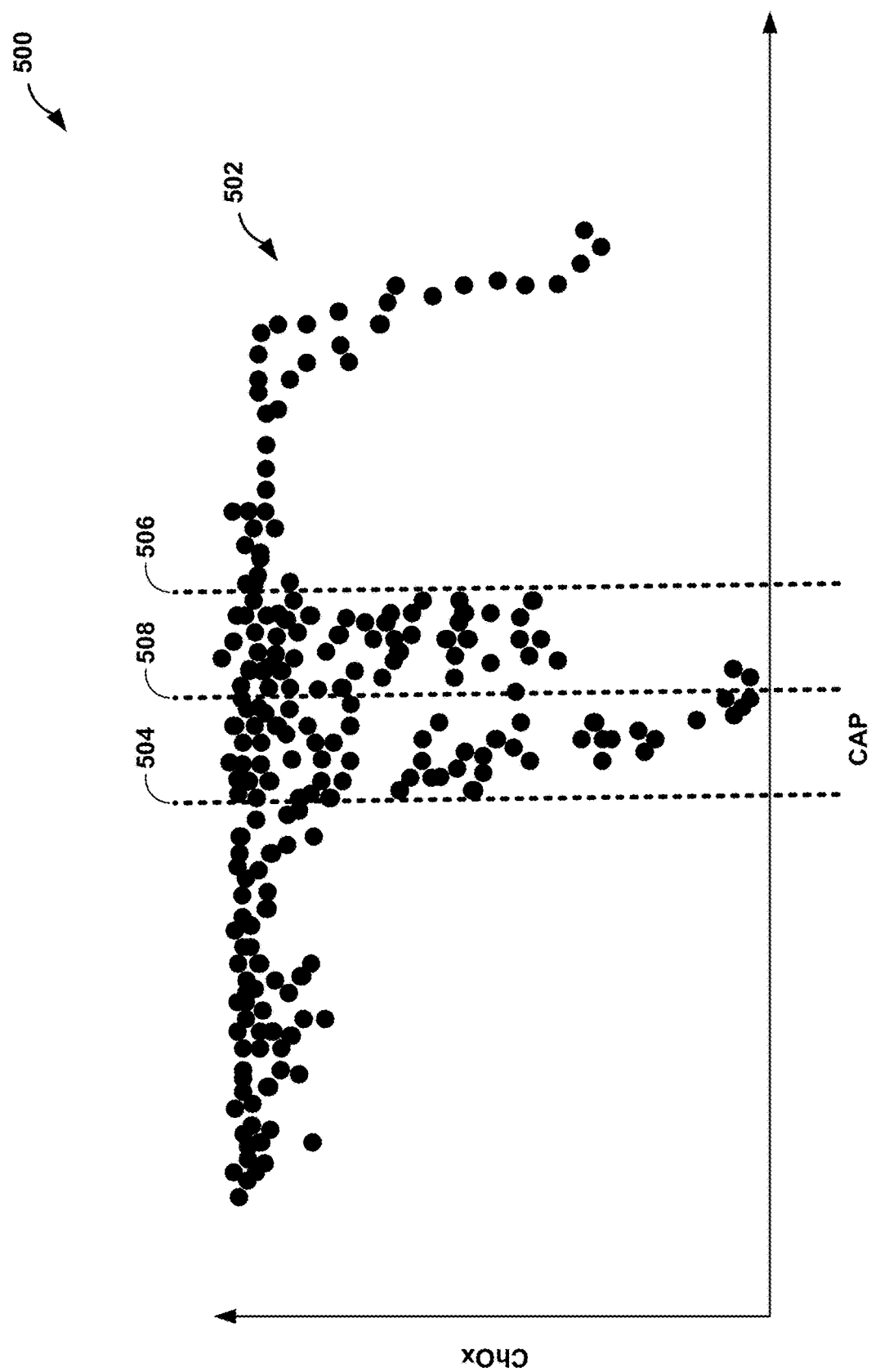
FIG. 5 illustrates an example graph of a correlation index ChOx based on determined CAP values versus CAP (blood pressure).

As discussed above, processing circuitry 110 may determine a correlation index ChOx based on the determined CAP value and the measured oxygen saturation value. FIG. 5 illustrates an example graph 500 of ChOx versus CAP. In some examples, graph 500 or a similar graphic may be displayed to a clinician, for example, by processing circuitry 110 via user interface 130. Graph 500 includes a plurality of correlation values 502 representing respective ChOx values determined by processing circuitry 110 for respective CAP values. In other examples, a correlation graph may include ChOx (determined using CAP values) versus MAP. As discussed above, in some examples, processing circuitry 110 may determine an estimate of LLA 504 based on the lowest CAP at which the ChOx is less than a threshold value, such as 0.5, 0.4, 0.3, 0.2, 0.1, or 0.0. Similarly, processing circuitry 110 may determine an estimate of ULA 506 based on the highest blood pressure value at which the ChOx is less than a threshold value. Additionally, or alternatively, processing circuitry 110 may determine an estimate of target blood pressure (TBP) 508 based on the LLA and/or ULA, or based on the distribution of correlation values 502. Processing circuitry 110 may compare LLA 504, ULA 506, and/or TBP 508 to the blood pressure signal (e.g., a current blood pressure of patient 101) to determine an autoregulation status of patient 101. For example, whether the autoregulation status is intact, e.g., the current blood pressure of patient 101 is within LLA 504 and ULA 506 (or within a predetermined threshold pressure of LLA 504, ULA 506, and/or TBP 508), or impaired, e.g., the current blood pressure of patient 101 is outside of LLA 504 and ULA 506 (or outside of a predetermined threshold pressure of LLA 504, ULA 506, and/or TBP 508). In some examples, processing circuitry 110 may be configured to display, e.g., via user interface 130, one or more of LLA 504, ULA 506, TBP 508, and/or a current blood pressure of patient 101. In this way, processing circuitry 110 may determine an autoregulation status of the patient based on the CAP value, and in some examples display, a signal indicative of the autoregulation status of the patient to an output device.

Figure 6:
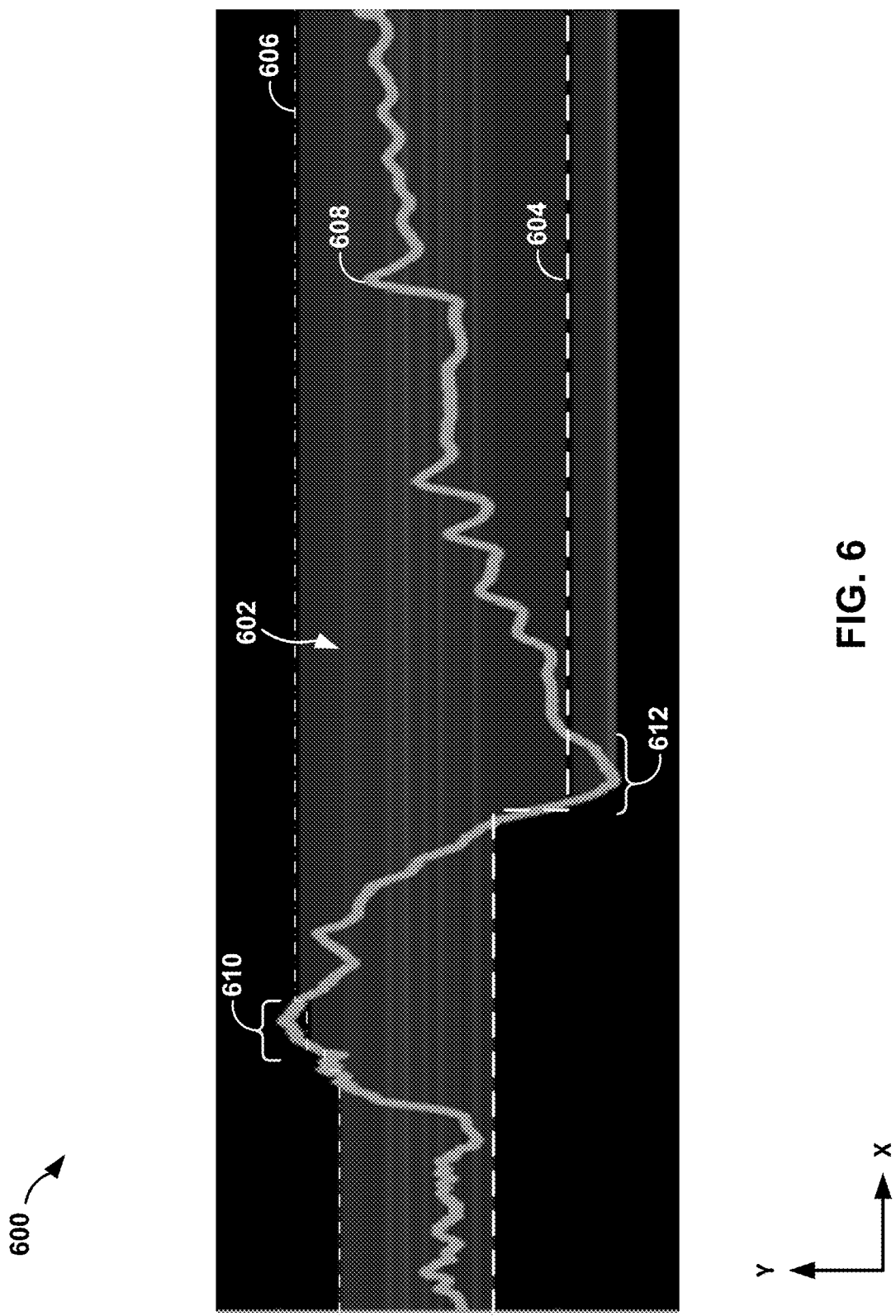
FIG. 6 illustrates an example graphs of blood pressure over time, a plurality of autoregulation values, and the lower limit of autoregulation.

FIG. 6 illustrates an example graph 600 of blood pressure versus time, a plurality of autoregulation values 602, an LLA 604, and a ULA 606. Time is represented along the x-axis of graph 600, and blood pressure is represented along the y-axis of graph 600. Processing circuitry 110 may be configured to display graph 600 via user interface 130, such as on display 132. Processing circuitry 110 may be configured to display graph 600 to show indications of blood pressure values 608 of patient 101 over time. In some examples, indications of blood pressure values 608 may include CAP values, as discussed above. In some examples, indications of blood pressure values 608 may include MAP values, as discussed above. In some examples, processing circuitry 110 may be configured to display more than one indication of blood pressure values, such as, for example, both CAP values and MAP values.

Processing circuitry 110 also may be configured to display an indication of autoregulation status of the patient on graph 600. For example, processing circuitry 110 may be configured to display a plurality of autoregulation values 602. The plurality of autoregulation values at any time may be represented as a slice or cross-section of graph 600 in the y-axis direction. In some examples, the indication of autoregulation status of the patient may include LLA values, ULA values, and/or target blood pressure values. For example, processing circuitry 110 may be configured to display indications of blood pressure values 608 between or outside of LLA 604 and ULA 606. As illustrated in FIG. 6, LLA 604 and ULA 606 may change over time. For example, processing circuitry 110 may update LLA values and ULA values over time, e.g., as the blood pressure of the patient changes over time. The region above LLA 604 and below ULA 606 may include an intact autoregulation zone or region. The regions below LLA 604 and above ULA 606 may include an impaired autoregulation zone or region. For example, regions indicated by brackets 610 and 612 may include impaired autoregulation regions In some examples, processing circuitry 110 may be configured to present graph 600 via display 132 with colors to indicate plurality of autoregulation values 602. For example, processing circuitry 110 can present a green color for autoregulation values representing an intact autoregulation state, a red color for autoregulation values representing an impaired autoregulation state, and a black color for autoregulation values representing an uncategorized autoregulation state. Processing circuitry 110 may be configured to output, for display, data indicative of a color for a modified autoregulation value responsive to determining that modified autoregulation value represents a respective autoregulation state. FIG. 6 depicts these colors in greyscale as different shades of grey.

Figure 7:
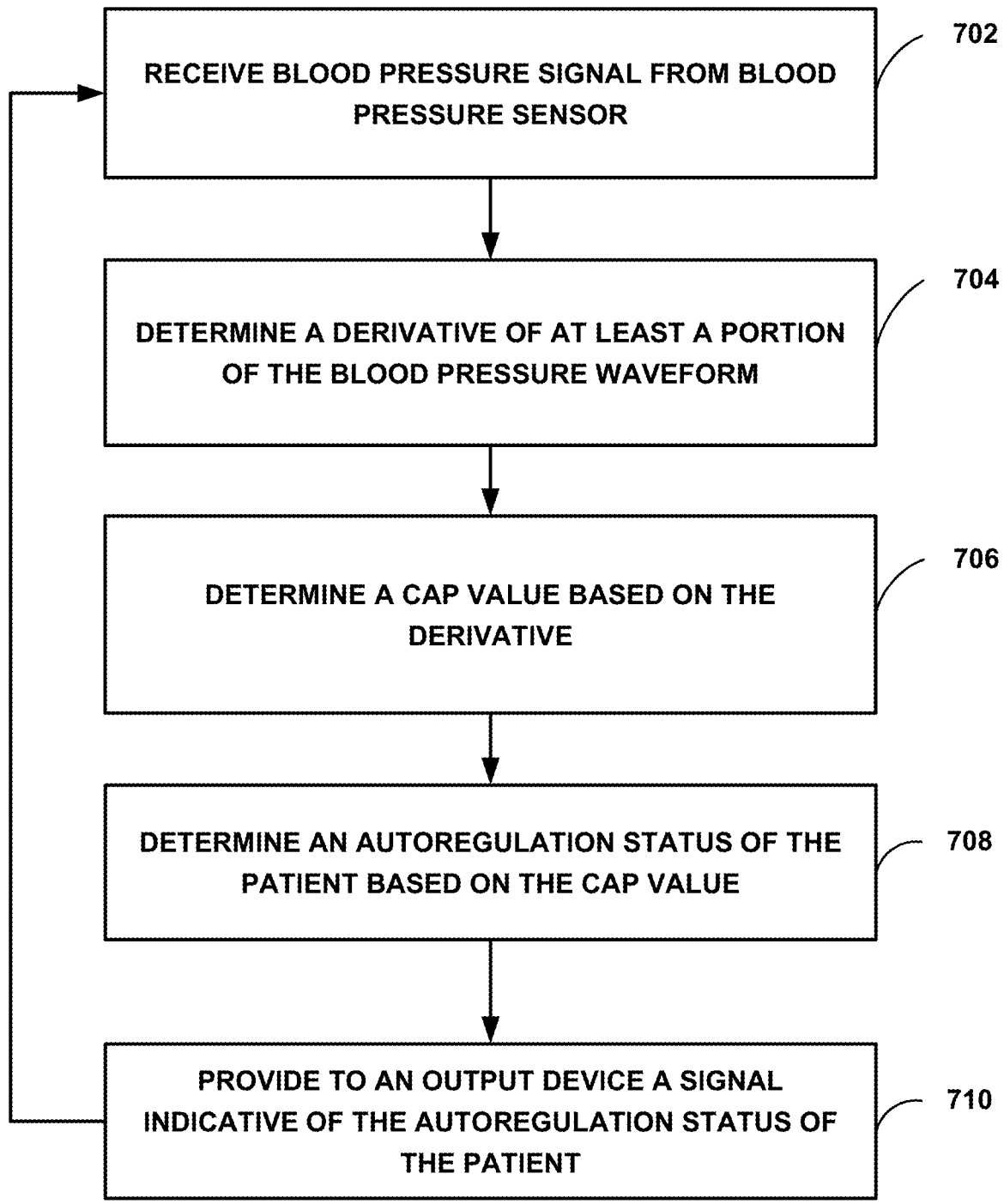
FIG. 7 is a flow diagram illustrating an example method of monitoring the autoregulation status of a patient.

FIG. 7 is a flow diagram illustrating an example method of monitoring the autoregulation status of a patient.

Although FIG. 7 is described with respect to processing circuitry 110 of autoregulation monitoring system 100 (FIG. 1), in other examples, different processing circuitry, alone or in combination with processing circuitry 110, may perform any part of the technique of FIG. 7.

The technique illustrated in FIG. 7 includes receiving, by processing circuitry 110, a blood pressure signal indicative of a blood pressure waveform of a patient (702). In some examples, receiving the blood pressure signal (702) includes measuring the blood pressure of patient 101 at acquisition site 103, as discussed above. In some examples, the blood pressure signal may include a plurality of blood pressure signals. Each blood pressure signal of the plurality of blood pressure signals may be indicative of a blood pressure of patient 101 at a respective acquisition site of a plurality of acquisition sites.

The technique illustrated in FIG. 7 also includes determining, by processing circuitry 110, a derivative of at least a portion of the blood pressure signal, which may represent a waveform of the blood pressure (704). As discussed above, determining the derivative (704) may include determining a function representative of the blood pressure waveform or determining rate of change of adjacent data points of the blood pressure waveform. In some examples, determining the derivative may include determining a subset of data points of the blood pressure waveform for which processing circuitry may determine the function or rates of change.

The technique illustrated in FIG. 7 also includes determining, by processing circuitry 110, a CAP value based on the derivative (706). For example, processing circuitry 110 may determine the CAP as the blood pressure in the blood pressure signal at the time corresponding to the determined minima and/or maxima of the derivative, in some examples, by interpolation.

In examples in which the blood pressure signal includes a plurality of blood pressure signals, determining the CAP value (706) may be based on the plurality of blood pressure signals. For example, processing circuitry 110 may determine for each respective blood pressure signal a respective CAP values of a plurality of CAP values. In some examples, processing circuitry 110 may determine an average of the plurality of CAP values, such as a mean or a weighted-average. Additionally or alternatively, processing circuitry 110 may determine an average of the plurality of blood pressure signals, such as a mean or a weighted-average, and determine an CAP value based on the average of the plurality of blood pressure signals.

The technique illustrated in FIG. 7 also includes determining, by processing circuitry 110, a metric indicative of the autoregulation status of patient 101 based on the CAP value (708). In some examples, determining the metric indicative of the autoregulation status of patient 101 (708) may include determining at least one of an LLA or a ULA based on the CAP value. For example, as discussed above, processing circuitry 110 may determine a correlation index ChOx based on the determined the CAP value and the measured oxygen saturation value, or additional or alternative physiological parameters, and then determine an estimate of an LLA based on the lowest blood pressure value at which the expected value of ChOx is less than a threshold value and/or a ULA based on the highest blood pressure value at which the expected value of ChOx is greater than a threshold value. The metric may also, or alternatively, be the CAP value or an average CAP value (e.g., mean, median, mode, running average, weighted average, etc.) that is compared to the LLA and ULA.

The technique illustrated in FIG. 7 also includes providing, by processing circuitry 110, a signal indicative of the autoregulation status of patient 101 to an output device, such as user interface 130 (710). For example, as discussed above, display 132 and/or speaker 136 may present to a clinician a graphical user interface that includes an indicator of autoregulation status, such as text, colors, and/or audio. Processing circuitry 110 may be further configured to control display 132 to present the indication of one or more limits of autoregulation, blood pressure(s), oxygen saturation(s), or the like, via the graphical user interface. In some examples, the technique illustrated in FIG. 7 may include repeating steps 702, 704, 706, 708, and 710, such as, for example, at least once for each cardiac cycle.

The techniques described in this disclosure, including those attributed to device 100, processing circuitry 110, control circuitry 122, sensing circuitries 140, 142, or various constituent components, may be implemented, at least in part, in hardware, software, firmware or any combination thereof. For example, various aspects of the techniques may be implemented within one or more processors, including one or more microprocessors, DSPs, ASICs, FPGAs, or any other equivalent integrated or discrete logic circuitry, as well as any combinations of such components, embodied in programmers, such as clinician or patient programmers, medical devices, or other devices. Processing circuitry, control circuitry, and sensing circuitry, as well as other processors and controllers described herein, may be implemented at least in part as, or include, one or more executable applications, application modules, libraries, classes, methods, objects, routines, subroutines, firmware, and/or embedded code, for example.

In one or more examples, the functions described in this disclosure may be implemented in hardware, software, firmware, or any combination thereof. If implemented in software, the functions may be stored on, as one or more instructions or code, a computer-readable medium and executed by a hardware-based processing unit. The computer-readable medium may be an article of manufacture including a non-transitory computer-readable storage medium encoded with instructions. Instructions embedded or encoded in an article of manufacture including a non-transitory computer-readable storage medium encoded, may cause one or more programmable processors, or other processors, to implement one or more of the techniques described herein, such as when instructions included or encoded in the non-transitory computer-readable storage medium are executed by the one or more processors. Example non-transitory computer-readable storage media may include RAM, ROM, programmable ROM (PROM), erasable programmable ROM (EPROM), electronically erasable programmable ROM (EEPROM), flash memory, a hard disk, a compact disc ROM (CD-ROM), a floppy disk, a cassette, magnetic media, optical media, or any other computer readable storage devices or tangible computer readable media.

In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RAM or cache).

The functionality described herein may be provided within dedicated hardware and/or software modules. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components. Also, the techniques could be fully implemented in one or more circuits or logic elements.

The following clauses illustrate example subject matter of the present disclosure.

Clause 1. A method comprising: receiving, by processing circuitry, a blood pressure signal indicative of a blood pressure of a patient; determining, by the processing circuitry, a derivative of at least a portion of the blood pressure signal; determining, by the processing circuitry and based on the derivative, a characteristic arterial pressure (CAP) value of the blood pressure signal; determining, by the processing circuitry and based on the CAP value, an autoregulation value of the patient; and outputting, by the processing circuitry, a signal indicative of the autoregulation value of the patient.

Clause 2. The method of clause 1, wherein determining the CAP value comprises determining a blood pressure value from the blood pressure signal corresponding to a maximum value or a minimum value of the derivative during at least one of a systolic upstroke, a systolic decline, or a diastolic runoff of the blood pressure of the patient.

Clause 3. The method of clause 1, wherein determining the CAP value comprises determining a blood pressure value from the blood pressure signal corresponding to a maximum value of a first derivative of the blood pressure signal during a systolic upstroke.

Clause 4. The method of any one of clauses 1 through 3, wherein the method further comprises receiving, by processing circuitry, a signal indicative of cerebral blood flow of the patient.

Clause 5. The method of any one of clauses 1 through 4, wherein the method further comprises receiving, by processing circuitry, an oxygen saturation signal indicative of an oxygen saturation value of the patient.

Clause 6. The method of clause 5, wherein determining the autoregulation status comprises determining, by processing circuitry, a correlation index (ChOx) based on a correlation between the CAP value and the oxygen saturation value.

Clause 7. The method of clause 5, wherein determining the autoregulation status comprises: determining a gradient of the CAP value over a period of time; determining a gradient of the oxygen saturation signal over the period of time; determining, based on the gradient of the CAP value and the gradient of the oxygen saturation signal, the autoregulation status of the patient.

Clause 8. The method of any one of clauses 1 through 7, wherein determining the autoregulation value of the patient comprises determining, based at least in part on the CAP value, at least one of a lower limit of autoregulation or an upper limit of autoregulation.

Clause 9. The method of any one of clauses 1 through 8, wherein outputting the signal indicative of the autoregulation value of the patient to the output device comprises controlling, by the processing circuitry, a user interface to output to a user an indication of the autoregulation value or an autoregulation status representative of the autoregulation value.

Clause 10. The method of clause 9, wherein the user interface comprises a display, and wherein the method further comprises controlling, by the processing circuitry, the user interface to display a mean arterial pressure (MAP) based on the blood pressure of the patient.

Clause 11. The method of any one of clauses 1 through 10, wherein the blood pressure signal is clipped as to not represent at least one maximum value or minimum value of the blood pressure signal.

Clause 12. The method of any one of clauses 1 through 11, wherein the derivative comprises a plurality of derivatives, and wherein determining the CAP value comprises: determining, by the processing circuitry and based on each respective derivative of the plurality of derivatives, a respective CAP value of a plurality of CAP values; and determining, by the processing circuitry and based on the plurality of CAP values, an average CAP value.

Clause 13. A system comprising processing circuitry configured to: receive a blood pressure signal indicative of a blood pressure of a patient; determine a derivative of at least a portion of the blood pressure signal; determine, based on the derivative, a characteristic arterial pressure (CAP) value; determine, based on the CAP value, an autoregulation value of the patient; and output a signal indicative of the autoregulation value of the patient.

Clause 14. The system of clause 13, wherein the CAP value comprises a blood pressure value from the blood pressure signal corresponding to a maximum value or a minimum value of the derivative during at least one of a systolic upstroke, a systolic decline, or a diastolic runoff of the blood pressure of the patient.

Clause 15. The system of clause 13, wherein the CAP value comprises a blood pressure value from the blood pressure signal corresponding to a maximum value of a first derivative of the blood pressure signal during a systolic upstroke.

Clause 16. The system of any one of clauses 13 through 15, wherein the system further comprises a sensor configured to generate a signal indicative of the cerebral blood flow of the patient, and wherein the wherein the processing circuitry is configured to receive the signal indicative of the cerebral blood flow.

Clause 17. The system of any one of clauses 13 through 16, wherein the system further comprises: a blood pressure sensor configured to generate the blood pressure signal indicative of the blood pressure of the patient; and an oxygen saturation sensor configured to generate an oxygen saturation signal indicative of an oxygen saturation value of the patient, and wherein the processing circuitry is configured to receive the oxygen saturation signal.

Clause 18. The system of clause 17, wherein the autoregulation status comprises a correlation index (ChOx) based on a correlation between the CAP value and the oxygen saturation value.

Clause 19. The system of clause 17, wherein processing circuitry configured to determine a gradient of the CAP value over a period of time; determine a gradient of the oxygen saturation signal over the period of time; determine, based on the gradient of the CAP value and the gradient of the oxygen saturation signal, the autoregulation status of the patient.

Clause 20. The system of any one of clauses 13 through 19, wherein the autoregulation value of the patient comprises at least one of a lower limit of autoregulation or an upper limit of autoregulation.

Clause 21. The system of any one of clauses 13 through 20, further comprising a user interface, wherein the processing circuitry is further configured to control the user interface to output to a user the autoregulation value or an autoregulation status representative of the autoregulation value.

Clause 22. The system of clause 21, wherein the user interface comprises a display, wherein the processing circuitry is further configured to control the display to display a mean arterial pressure (MAP) based on the blood pressure of the patient.

Clause 23. The system of any one of clauses 13 through 22, wherein the blood pressure signal is clipped as to not represent at least one maximum value or minimum value of the blood pressure signal.

Clause 24. The system of any one of clauses 13 through 23, wherein the derivative comprises a plurality of derivatives, and wherein the processing circuitry is configured to: determine, based on each respective derivative of the plurality of derivatives, a respective CAP value of a plurality of CAP values; and determine, based on the plurality of CAP values, an average CAP value.

Clause 25. A non-transitory computer readable storable medium comprising instructions that, when executed, cause processing circuitry to: receive a blood pressure signal indicative of a blood pressure of a patient; determine a derivative of at least a portion of the blood pressure signal; determine, based on the derivative, a characteristic blood pressure (CAP) value; determine, based on the CAP value, an autoregulation value of the patient; and output a signal indicative of the autoregulation value of the patient.

Clause 26. The non-transitory computer readable storable medium of clause 25, wherein the instructions, when executed, cause processing circuitry to perform the method of any one of clauses 2 through 12.

Various examples of the disclosure have been described. Any combination of the described systems, operations, or functions is contemplated. These and other examples are within the scope of the following claims.

What is claimed is:

1. A method comprising:
generating, by blood pressure sensing circuitry, a blood pressure signal comprising a blood pressure waveform indicative of fluctuating blood pressure values of the patient through cardiac cycles of the patient;
receiving, by processing circuitry within a housing of an autoregulation monitoring device, the blood pressure signal from the blood pressure sensing circuitry;
removing, by the processing circuitry, erroneous portions of the blood pressure signal by selecting a subset of data points of the blood pressure signal;
determining, by the processing circuitry, characteristic arterial pressure (CAP) values from the selected subset of data points of the blood pressure signal, wherein the CAP values are a representation of arterial pressure over time and are different from the blood pressure values of the patient;
receiving, by the processing circuitry, an oxygen saturation signal indicative of an oxygen saturation of the patient;
determining, by the processing circuitry, an upper limit of autoregulation based on the CAP values and the oxygen saturation signal and a lower limit of autoregulation based on the CAP values and the oxygen saturation signal;
generating, by the processing circuitry, a graph comprising an intact autoregulation zone between the upper limit of autoregulation and the lower limit of autoregulation, and an impaired autoregulation zone extending above the upper limit of autoregulation, or below the lower limit of autoregulation, or both; and
controlling, by the processing circuitry, a user interface to display the blood pressure signal overlaid onto the graph and
tracking, on the graph, changes over time in the displayed blood pressure, the intact autoregulation zone, and the impaired autoregulation zone.

2. The method of claim 1, wherein determining the CAP values comprises determining a maximum value or a minimum value of a derivative of the selected subset of data points of the blood pressure signal during a systolic upstroke, a systolic decline, or a diastolic runoff of the blood pressure of the patient.

3. The method of claim 1, wherein determining an autoregulation status comprises determining, by the processing circuitry, a correlation index (ChOx) based on a correlation between the CAP values and the oxygen saturation signal.

4. The method of claim 1, wherein determining an autoregulation status comprises:
determining a gradient of the CAP value over a period of time;
determining a gradient of the oxygen saturation signal over the period of time; and
determining, based on co-trending of the gradient of the CAP value and the gradient of the oxygen saturation signal, the autoregulation status of the patient.

5. The method of claim 1, wherein the erroneous portions of the blood pressure signal comprise one or more of morphological anomalies, noise, or clipped portions.

6. The method of claim 1, wherein determining the CAP values comprises determining a rate of change between consecutive data points of the subset of data points.

7. A system comprising:
a graphical user interface;
blood pressure sensing circuitry configured to generate a blood pressure signal comprising a blood pressure waveform indicative of fluctuating blood pressure values of the patient through cardiac cycles of the patient; and
processing circuitry within a housing of an autoregulation monitoring device, wherein the processing circuitry is configured to:
receive the blood pressure signal from the blood pressure sensing circuitry;
remove erroneous portions of the blood pressure signal by selecting a subset of data points of the blood pressure signal;
determine characteristic arterial pressure (CAP) values from the subset of data points, wherein the CAP values are a representation of arterial pressure over time and are different from the blood pressure values of the patient;
correlate the CAP values with an oxygen saturation signal of the patient to produce a correlation index;
determine an upper limit of autoregulation and a lower limit of autoregulation based on the correlation index;
generate a graph comprising an intact autoregulation zone extending between the upper limit of autoregulation and the lower limit of autoregulation, and an impaired autoregulation zone extending above the upper limit of autoregulation, or below the lower limit of autoregulation, or both; and
control the graphical user interface to display indications of the blood pressure values overlaid onto the graph.

8. The system of claim 7, wherein the CAP values comprise a maximum value or a minimum value of a derivative of the selected subset of data points of the blood pressure signal during a systolic upstroke, a systolic decline, or a diastolic runoff of the blood pressure of the patient.

9. The system of claim 7, wherein the processing circuitry being configured to correlate the CAP values with the oxygen saturation signal comprises being is configured to:
   determine a gradient of the CAP values over a period of time;
   determine a gradient of the oxygen saturation signal over the period of time; and
   co-trend the gradients.

10. The system of claim 7, wherein the erroneous portions of the blood pressure signal comprise one or more of morphological anomalies, noise, or clipped portions.

11. The system of claim 7, wherein the upper limit of autoregulation and the lower limit of autoregulation comprises a respective upper and lower blood pressure value at which the correlation index is less than a threshold value.

12. The system of claim 7, wherein the processing circuitry is configured to, during a patient monitoring session:
   update the lower limit of autoregulation, the upper limit of autoregulation, or both based on the CAP values and the oxygen saturation signal; and
   update the graph to reflect the update to the lower limit of autoregulation, the upper limit of autoregulation, or both.

13. The system of claim 7, wherein the upper limit of autoregulation and the lower limit of autoregulation on the graph change over time.

14. A method for medical monitoring, comprising:
   generating, from a blood pressure sensor, a blood pressure signal comprising fluctuating blood pressure values of a patient through cardiac cycles of the patient;
   transmitting the blood pressure signal to an autoregulation monitor;
   discarding, by the autoregulation monitor, portions of the blood pressure signal comprising one or more of an anomaly, noise, or error;
   selecting a subset of a remaining portion of the blood pressure signal, the subset being contained within a single cardiac cycle;
   determining, from the selected subset, a characteristic arterial pressure (CAP) value representative of arterial pressure;
   repeating the discarding, selecting, and determining for subsequent cardiac cycles of the patient to produce a CAP curve;
   correlating the CAP curve with an oxygen saturation signal of the patient to identify an autoregulation status of the patient; and
   displaying a graph of blood pressure over time, the graph comprising an intact autoregulation zone and an impaired autoregulation zone and a blood pressure line overlaid on the graph.

15. The method of claim 14, wherein determining the CAP value comprises determining a derivative of the selected subset.

16. The method of claim 14, wherein the oxygen saturation signal comprises a regional oxygen saturation (rSO2) in a cerebral region of the patient.

17. The method of claim 14, wherein correlating the CAP curve and the oxygen saturation signal of the patient comprises comparing a gradient of the CAP curve with a gradient of the oxygen saturation signal.

18. The method of claim 14, wherein correlating comprises generating a correlation index between zero and one, and wherein the intact autoregulation zone extends between a lower limit of autoregulation and an upper limit of autoregulation, wherein:
   the lower limit is based on a lowest blood pressure value at which the correlation index is less than a threshold value, and
   the upper limit is based on a highest blood pressure value at which the correlation index is less than the threshold value.

* * * * *